United States Patent
Kakuta

(10) Patent No.: US 7,078,084 B2
(45) Date of Patent: Jul. 18, 2006

(54) OPTICAL INFORMATION RECORDING MEDIUM TRANSPARENT SHEET, PROCESS FOR PRODUCING THE SAME, AND OPTICAL INFORMATION RECORDING MEDIUM

(75) Inventor: Takeshi Kakuta, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 17 days.

(21) Appl. No.: 10/798,424

(22) Filed: Mar. 12, 2004

(65) Prior Publication Data

US 2004/0180172 A1    Sep. 16, 2004

(30) Foreign Application Priority Data

Mar. 12, 2003   (JP) ............................. 2003-066057

(51) Int. Cl.
   *B32B 3/02*   (2006.01)
(52) U.S. Cl. .................. 428/64.1; 428/64.4; 428/65.2; 430/270.11; 156/273.3
(58) Field of Classification Search ............... 428/64.1, 428/64.4, 65.2, 913; 430/270.11; 156/253, 156/273.3, 184, 191, 192, 275.5, 275.7, 289
See application file for complete search history.

(56) References Cited

U.S. PATENT DOCUMENTS

| 2003/0081537 A1* | 5/2003 | Shinotsuka ............... 369/275.4 |
| 2003/0148215 A1* | 8/2003 | Kakuta et al. .......... 430/270.15 |
| 2003/0183511 A1* | 10/2003 | Kakuta et al. ......... 204/192.27 |

FOREIGN PATENT DOCUMENTS

| JP | 2000-67468 A | 3/2000 |
| JP | 3112467 B2 | 9/2000 |

* cited by examiner

*Primary Examiner*—Elizabeth Mulvaney
(74) *Attorney, Agent, or Firm*—Sughrue Mion, PLLC

(57) ABSTRACT

The present invention provides a process for producing an optical information recording medium transparent sheet, including applying a radiation-curable resin coating solution continuously to one surface of a cover film wound in a roll form, followed by continuously irradiating the coat formed in order to cure the coat and thereby form a hard coat layer, forming an adhesive layer continuously onto another surface of the cover film, and winding back into a roll form the cover film on which the hard coat layer and the adhesive layer have been formed; an optical information recording medium transparent sheet produced by this production process, and an optical information recording medium provided with this optical information recording medium transparent sheet.

20 Claims, No Drawings

OPTICAL INFORMATION RECORDING MEDIUM TRANSPARENT SHEET, PROCESS FOR PRODUCING THE SAME, AND OPTICAL INFORMATION RECORDING MEDIUM

CROSS-REFERENCE TO RELATED APPLICATION

This application claims priority under 35 USC 119 from Japanese Patent Application No. 2003-66057, the disclosure of which is incorporated by reference herein.

BACKGROUND OF THE INVENTION

1. Field of the Invention

The present invention relates to a process for producing an optical information recording medium transparent sheet (i.e., a transparent sheet for an optical information recording medium), an optical information recording medium transparent sheet produced by this production process, and an optical information recording medium provided with this optical information recording medium transparent sheet.

2. Description of the Related Art

Conventional write-once type optical information recording media, on which information can be written only once by irradiation with laser light, are called CD-Rs and are widely known. Such media have the merit that information can be reproduced by means of CD players already commercially available, and with the recent spread of personal computers, demand for such CD players has been increasing. As media capable of recording a larger capacity of information than that of CD-Rs, write-once type digital versatile discs (DVD-Rs) have also become popular in response to demand for digital high-vision recordings.

As one example of the structure, a write-once type optical information recording medium is known comprising a disc substrate having disposed thereon, in order, a light-reflective layer containing Au or the like, a recording layer containing an organic compound and a cover layer which includes an adhesive layer to allow adhesion to the recording layer. Information can be recorded and reproduced by radiating laser light onto this medium from the side provided with the resin layer. Specifically, the portion of the recording layer that is irradiated absorbs light, and as a result the temperature rises locally at the irradiated portion. The temperature thus raised produces a deformation at the irradiated portion (e.g., formation of pits), whereby information is recorded. The information thus recorded on the media is usually reproduced by irradiating the media with laser light having the same wavelength as that of the laser light used to record the information, and by detecting a difference in the rate of irradiation between the thermally deformed region of the recording layer (recorded portion) and the non-deformed region of the recording layer (unrecorded portion).

Recently, high-vision television and networks such as the Internet have rapidly become more widespread. In addition, HDTV (High Definition Television) broadcasting has begun. Under these circumstances, large-capacity optical information media capable of recording visual information easily and inexpensively are in demand. While DVD-Rs currently play a significant role as large capacity recording media, the demand for media having even greater recording capacity and even higher density continues to escalate, and development of recording media that can cope with this demand is also needed. For this reason, further progress has been made in the development of recording media which have even greater storage capacity, with which high-density recording can be effected by means of short wave light. In particular, the development of write-once type optical information recording media, on which information can be recorded only once, is strongly desired since the frequency with which such media are used is increasing, resulting from the fact that a large capacity of information can be stored for prolonged periods or used as back-up information.

Usually, the recording density of an optical information recording medium may be increased by shortening the wavelength of a laser beam for recording and reproducing, or alternatively by making the beam spot smaller by increasing a numerical aperture (NA) of the object lens. Recently, lasers ranging from red semiconductor lasers having wavelengths of 680, 650 and 635 nm to blue-violet semiconductor lasers (hereinafter referred to as "blue-violet lasers") having wavelengths of 400 to 500 nm and capable of recording information at a ultra-high density have made advances, and optical information recording media capable of accommodating these lasers have also been developed. In particular, since the blue-violet lasers were launched, an optical recording system that uses a blue-violet laser and a high NA pick-up has been developed and researched, and a rewritable optical information recording medium and an optical recording system having a phase transition recording layer have been developed as a DVR system ("ISOM 2000", pp 210–211). This system constitutes a certain degree of success in the search for higher recording density in rewritable optical information recording media.

In an optical information recording medium used in an optical recording system utilizing the blue-violet laser and a high NA pick-up, when the recording layer is irradiated with blue-violet laser light for properly focusing the object lens having a high NA, it is preferable to make a cover layer thinner. The cover layer is made, for example, of a transparent thin film, and is adhered to the recording layer with a bonding agent or a adhesive. A thickness of the cover layer including a thickness of the bonding layer or the adhesive layer formed by curing the bonding agent or the adhesive, is normally about 100 μm. This thickness can be optimized depending on a wavelength of the laser irradiated or the NA. However, since, as described above, such an optical information recording medium utilizes a high-NA pick-up, a distance between the pick-up and the cover layer is small, and surface fluctuation of the optical information recording medium forces the pick-up portion into contact with the cover layer. As a result, a problem arises that the cover layer is becomes prone to contact blemishes.

To cope with this problem, a method of forming an blemish-preventive layer or a hard coat layer on the cover layer has been proposed, using spin coating or vacuum depositing, such that the cover layer can be protected from contact blemishes (see, for example, Japanese Patent Application Laid-Open (JP-A) No. 2000-67468 and Japanese Patent No. 3112467). However, this kind of blemish-preventive layer or hard coat layer has been formed and disposed on cover layers on a one-by-one basis, thus posing a problem of low productivity. In cases where such a blemish-preventive layer or hard coat layer has been formed by spin coating, the thickness of the layer has tended to increase toward its outwardmost portion because of centrifugal force, thereby creating a problem insofar that layers produced have been deficient in terms of a thickness precision.

SUMMARY OF THE INVENTION

An object of the present invention is thus to provide a process for producing an optical information recording medium transparent sheet which combines satisfactory thickness precision with high productivity, an optical information recording medium transparent sheet produced by this production process, and an optical information medium provided with this optical information recording medium transparent sheet.

The present inventor conducted extensive research and discovered that in a process for producing an optical information recording medium transparent sheet provided with both a cover layer, composed of a cover film which includes an adhesive layer, and a hard coat layer, thickness precision can be improved by forming the cover layer and the hard coat layer continuously so that high productivity can be achieved, and by applying coating on the hard coat layer continuously so that enhanced precision in layer thickness can be achieved.

Accordingly, the present invention provides the following.

A first aspect of the invention is to provide a process for producing an optical information recording medium transparent sheet which comprises: applying a radiation-curable resin coating solution continuously to one surface of a cover film wound in a roll form, followed by continuously irradiating the coat formed in order to cure the coat and thereby form a hard coat layer; forming an adhesive layer continuously onto another surface of the cover film; and winding back into a roll form the cover film on which the hard coat layer and the adhesive layer have been formed.

A second aspect of the invention is to provide a process for producing an optical information recording medium transparent sheet, which comprises: applying a radiation-curable resin coating solution continuously to one surface of a cover film wound in a roll form, followed by continuously irradiating the coat formed in order to cure the coat and thereby form a hard coat layer; forming an adhesive layer continuously onto another surface of the cover film; and punching out into a disc form the cover film on which the hard coat layer and the adhesive layer have been formed.

A third aspect of the invention is to provide an optical information recording medium transparent sheet produced by a process comprising: applying a radiation-curable resin coating solution continuously to one surface of a cover film wound in a roll form, followed by continuously irradiating the coat formed in order to cure the coat and thereby form a hard coat layer; forming an adhesive layer continuously onto another surface of the cover film; and winding back into a roll form the cover film on which the hard coat layer and the adhesive layer have been formed.

A fourth aspect of the invention is to provide an optical information recording medium transparent sheet produced by a process comprising: applying a radiation-curable resin coating solution continuously to one surface of a cover film wound in a roll form, followed by continuously irradiating the coat formed in order to cure the coat and thereby form a hard coat layer; forming an adhesive layer continuously onto another surface of the cover film; and punching out into a disc form the cover film on which the hard coat layer and the adhesive layer have been formed.

A fifth aspect of the invention is to provide an optical information recording medium comprising a substrate having a recording layer, and the aforementioned optical information recording medium transparent sheet, disposed thereon, in that order.

In the process according to the first aspect or the second aspect, the winding back into a roll form the cover film on which the hard coat layer has been formed is performed between applying the radiation-curable resin coating solution continuously to the one surface of the rolled cover film followed by continuously irradiating the coat formed in order to cure the coat and thereby form the hard coat layer, and forming the adhesive layer continuously onto another surface of the cover film.

In the process according to the second aspect, the winding back into a roll form the cover film on which the hard coat layer and the adhesive layer have been formed is performed between forming the adhesive layer continuously onto another surface of the cover film, and punching out into a disc form the cover film on which the hard coat layer and the adhesive layer have been formed.

DETAILED DESCRIPTION OF THE INVENTION

Hereinafter, a process for producing an optical information recording medium transparent sheet, an optical information recording medium transparent sheet produced by the production process, and an optical information recording medium provided with this optical information recording medium transparent sheet, according to the present invention, will be described in detail.

First, the process for producing an optical information recording medium transparent sheet of the invention is described.

The process for producing an optical information recording medium transparent sheet according to a first embodiment of the invention comprises:

(a) applying a radiation-curable resin coating solution continuously to one surface of a cover film wound in a roll form, followed by continuously irradiating the coat formed in order to cure the coat and thereby form a hard coat layer;

(b) forming an adhesive layer continuously onto another surface of the cover film; and (c) winding back into a roll form the cover film on which the hard coat layer and the adhesive layer have been formed.

Each of the above-mentioned steps will be explained below.

<Step (a) of Applying a Radiation-Curable Resin Coating Solution Continuously to One Surface of a Cover Film Wound in a Roll Form, Followed by Continuously Irradiating the Coat Formed in Order to Cure the Coat and Thereby Form a Hard Coat Layer>

In the step (a), one end of a cover film wound into a roll form is extended as far as a given coating zone, and then a radiation-curable resin coating solution is continuously applied to one surface of the cover film from one end to the other end thereof, thereby forming a coat. Thereafter, UV rays are continuously radiated onto the coat to cure the radiation-curable resin, thereby forming a hard coat layer. In this way, the hard coat layer is formed on an entirety of one surface of the cover film.

This cover film used in the step (a) may be any film made of a transparent material. Preferable examples of the transparent material include polycarbonate; acryl resins such as polymethyl methacrylate; vinyl chloride resins such as polyvinyl chloride and polyvinyl chloride copolymer; epoxy resins; amorphous polyolefins; polyesters; and cellulose triacetate. Polycarbonate and cellulose triacetate are particularly preferable.

The term "transparent" as used herein means that a material has a transmittance of 80% or more with respect to light used for recording and reproducing information.

The cover film may comprise various additives insofar as advantageous effects of the invention is not affected. The cover film may comprise a UV absorbent for cutting light rays having wavelengths of 400 nm or less and/or a dye for cutting light rays having wavelengths of 500 nm or more.

Regarding surface physical properties of the cover film, it is preferable that a surface roughness based on a two-dimensional roughness parameter is 5 nm or less, and a surface roughness based on a three-dimensional roughness parameter is also 5 nm or less. From the viewpoint of the condensing degree of light used for recording and reproducing information, a birefringence of the cover film is preferably 10 nm or less.

For use as the cover film in a roll form, there may be used a cover film obtained by winding a film having 150 mm width and 200 m length onto an axis having 150 mm diameter.

A thickness of the cover film is preferably from 0.03 to 0.15 mm, and more preferably from 0.05 to 0.12 mm. By specifying the thickness within such a range, the cover film becomes easy to handle and coma may be suppressed.

The radiation-curable resin to be used in this step (a) may be any resin that can be cured by radiation. More specifically, the resin is preferably a resin having, in the molecule thereof, two or more radiation-sensitive double bonds. Examples thereof include acrylates, acrylamides, methacrylates, methacrylic amides, allyl compounds, vinyl ethers, and vinyl esters. Acrylate compounds and methacryalte compounds having two or more functional groups are particularly preferable.

Specific examples of the acrylate compounds and methacryalte compounds having two or more functional groups include those in which acrylic acid or methacrylic acid is added to an aliphatic diol, such as ethylene glycol diacrylate, propylene glycol diacrylate, butanediol diacrylate, hexanediol diacrylate, diethylene glycol diacrylate, triethylene glycol diacrylate, tetraethylene glycol diacrylate, neopentyl glycol diacrylate, tripropylene glycol diacrylate, ethylene glycol dimethacrylate, propylene glycol dimethacrylate, butanediol dimethacrylate, hexanediol dimethacrylate, diethylene glycol dimethacrylate, triethylene glycol dimethacrylate, tetraethylene glycol dimethacrylate, neopentyl glycol dimethacrylate, and tripropylene glycol dimethacrylate.

The following compounds may also be used: a polyether acrylate or polyether methacrylate in which acrylic acid or methacrylic acid is added to a polyether polyol such as polyethylene glycol, polypropylene glycol or polytetramethylene glycol; a polyester acrylate or polyester methacrylate in which acrylic acid or methacrylic acid is added to a polyester polyol obtained from a known dibasic acid and glycol;

a polyurethane acrylate or a polyurethane methacrylate in which acrylic acid or methacrylic acid is added to polyurethane obtained by reacting a known polyol or diol with polyisocyanate; and a compound in which acrylic acid or methacrylic acid is added to bisphenol A, bisphenol F, hydrogenated bisphenol A, hydrogenated bisphenol F, or an alkylene oxide adduct thereof; or a compound having a cyclic structure, such as isocyanuric acid alkylene oxide-modified diacrylate, isocyanuric acid alkylene oxide-modified methacrylate, tricyclodecanemethanol diacrylate, or tricyclodecanemethanol dimethacrylate.

These radiation-curable resins may be used alone or in combination of two or more thereof.

It is preferable to use, among these examples, any resin which may be cured by UV rays, that is, any UV ray curable resin.

As the radiation for curing the radiation-curable resin, electron beams or UV rays may be employed. In the case of using UV rays, it is preferable to add a photopolymerization initiator to the UV ray curable resin coating solution. As this photopolymerization initiator, an aromatic ketone is preferably used. The kind of the aromatic ketone is not particularly limited. It is preferable to use, as the ketone, an aromatic ketone having a relatively large absorption coefficient at wavelengths of 254, 313 and 365 nm, which are wavelengths of a bright-line spectrum of a mercury lamp, that is generally used as the UV ray radiating source. Typical examples thereof include acetophenone, benzophenone, benzoin ethyl ether, benzyl methyl ketal, benzyl ethyl ketal, benzoin isobutyl ketone, hydroxydimethyl phenyl ketone, 1-hydroxycyclohexyl phenyl ketone, 2,2-diethoxyacetophenone, and Michler's ketones.

The mixing ratio of the aromatic ketone is from 0.5 to 20 parts by mass, preferably from 2 to 15 parts by mass, and more preferably from 3 to 10 parts by mass relative to 100 parts by mass of the UV ray curable resin. A product in which a photopolymerization initiator has been beforehand added to the UV ray curable resin is commercially available as an UV ray curable adhesive, and such a commercially available product may be used. Examples of the commercially available product include Dicuria SD715 and Dicuria SD101 manufactured by Dainippon Ink & Chemicals, Inc., TB3042 manufactured by Three Bond Co., Ltd., and KCD805 manufactured by Nippon Kayaku Co., Ltd.

The radiation-curable resin, including commercially available products, is applied as it is onto the cover film, or is dissolved into a suitable solvent such as methyl ethyl ketone or ethyl acetate to prepare a coating solution and then the solution is applied onto the cover film. A known coating method may be used for application of coating. Specific examples of the coating method include spray coating, roll coating, blade coating, doctor roll coating, and screen print coating.

When electron beams are used to cure the radiation-curable resin, an electron beam accelerator is used.

As the UV ray source for curing the UV ray curable resin, a mercury lamp is employed. It is preferable to use a lamp having a power of 20 to 200 W/cm as the mercury lamp, with specifying a relative speed between the coating of the resin and the mercury lamp (that is, the conveying speed of the resin coating when a mercury lamp is fixed) from 0.3 to 20 m/min. In general, it is preferable that a distance between the resin coating and the mercury lamp is from 1 to 30 cm.

The electron beam accelerator, which is used in a radiating apparatus, may be employed in a scanning manner, a double scanning manner, or a curtain beam manner. Among these manners, the curtain beam manner, which can output a large power at relatively low costs, is preferable. Regarding characteristics of the electron beam, the accelerating voltage is from 100 to 1,000 kV, and preferably from 150 to 300 kV, and the absorbed dose thereof is from 0.5 to 20 Mrad, and preferably from 1 to 10 Mrad. If the accelerating voltage is less than 10 kV, an amount of transmitted energy is very low to thereby raise a problem that a sufficient polymerization reaction cannot be effected. If the accelerating voltage is more than 1,000 kV, the energy efficiency used for the polymerization is lowered to raise another problem in view of economy.

As described above, in the step (a), the hard coat layer is formed on one surface of the cover film. In order to progress the process forward to a step described below easily, the process may comprise the step of winding back into a roll form the cover film on which the hard coat layer has been formed after the step (a) is carried out, such that the cover film can be easily conveyed and the carrying property thereof may be improved.

<Step (b) of Forming an Adhesive Layer Continuously onto Another Surface of the Cover Film>

In this step, an adhesive layer is continuously formed on another surface of the cover film which has, on the one surface thereof, the hard coat layer as formed in the step (a). The method for forming the adhesive layer may be roughly classified into two methods, that is, a method of adhering a pre-formed adhesive layer to the cover film (hereinafter occasionally referred to as an "indirect method"), and a method of applying an adhesive directly onto the surface of the cover film and then drying the adhesive to form an adhesive layer (hereinafter occasionally referred to as a "direct method").

The "method of adhering a pre-formed adhesive layer to the cover film" is a method, for example, of applying the adhesive continuously onto one surface of a releasing film having the same size as the cover film and drying the adhesive so as to form the adhesive layer on an entirety of the one surface of the releasing film; and then adhering the adhesive layer onto the cover film. As a result, the adhesive layer provided with the releasing film is formed on the entirety of the another surface of the cover film.

The direct method is a method of: extending one end of the cover film wound in the roll form as far as a given coating zone; applying the adhesive continuously to one surface of the cover film from one end to the other end thereof, thereby forming a coat; and drying the coat continuously, thereby forming the adhesive layer on the entirety of the another surface of the cover film.

In the indirect method and the direct method, a conventionally known coating method may be used for applying the adhesive. Specific examples of the coating method include spray coating, roll coating, blade coating, doctor roll coating, and screen print coating.

In order to dry the adhesive, a known drying method such as heat drying or air-blast drying may be used.

The adhesive employed in the step (b) may be an acrylic type, rubber type or silicone type adhesive. From the viewpoint of transparency and durability, the acrylic type adhesive is preferable. This acrylic adhesive is preferably an adhesive in which 2-ethylhexyl acrylate or n-butyl acrylate used as the main component is additionally copolymerized with a short chain alkyl acrylate or methacrylate for improving flocculating force (for example, methyl acrylate, ethyl acrylate or methyl methacrylate) and a compound which may form a crosslinking site with a crosslinking agent (for example, acrylic acid, methacrylic acid, an acrylamide derivative, maleic acid, hydroxyethyl acrylate or glycidyl acrylate). The glass transition temperature (Tg) or the crosslinking density of the adhesive may be varied by adjusting the mixing ratios or the kinds of the main component, the short chain component and the component for adding the crosslinking site, appropriately.

Examples of the crosslinking agent used together with the adhesive include isocyanate-type crosslinking agents, epoxy resin-type crosslinking agents, melamine resin-type crosslinking agents, urea resin-type crosslinking agents, and chelate-type crosslinking agents. Among these examples, isocyanate-type crosslinking agents are preferable. As the isocyanate-type crosslinking agents, the following may be used: isocyanates such as tolylene diisocyanate, 4,4'-diphenylmethane diisocyanate, hexamethylene diisocyanate, xylylene diisocyanate, naphthylene-1,5-diisocyanate, o-toluidine isocyanate, isophorone diisocyanate, and triphenymethane triisocyanate; products obtained from any one of these isocyanates and a polyalcohol; and polyisocyanates produced by condensing these isocyanates. Examples of commercially available products of these isocyanates include Colonate L, Colonate Hl , Colonate 2030, Colonate 2031, Milionate MR, and Milionate HTL, each of which is manufactured by Nippon Polyurethane Industry Co., Ltd.; Takenate D-102, Takenate D-110 N, and Takenate D-200, and Takenate D-202, each of which is manufactured by Takeda Chemical Industries, Ltd.; and Desmodule L, Desmodule IL, Desmodule N, and Desmodule HL, each of which is manufactured by Sumitomo Bayer Co., Ltd.

In the step (b), the adhesive layer is formed on the another surface of the cover film. It is preferable to adhere a releasing film onto the surface of the adhesive layer in order to prevent, while the cover film is wound into a roll form, bonding between the hard coat layer and the adhesive layer in the step (c), which will be detailed later. As described above, in the indirect method, the cover film may be made into a form beforehand in which the releasing film has been adhered to the cover film. On the other hand, in the direct method, it is preferable to add an additional step of adhering the releasing film onto the surface of the adhesive layer after the adhesive layer has been formed on the surface of the cover film.

Examples of the releasing film to be adhered to the surface of the adhesive layer include a polyethylene film, a polyethylene terephthalate film, a polyethylene naphthalate film, a polycarbonate film, and a cellulose triacetate film.

<Step (c) of Winding Back into a Roll Form the Cover Film on which the Hard Coat Layer and the Adhesive Layer have been Formed>

By carrying out the step (c), the cover film on which the hard coat layer and the adhesive layer have been formed is wound into a roll form, thereby providing advantages that the resultant product can be more easily transferred and has better conveying property than a plate-form laminate having the same volume.

Detailed above is the process for producing an optical information recording medium transparent sheet according to the first embodiment of the invention. However, the invention is not limited to the above. For example, the steps (a) and (b) for forming the adhesive layer and the hard coat layer on the surface of the cover film may be continuously or simultaneously performed in the same apparatus, or may be performed in a reverse order.

The process for producing an optical information recording medium transparent sheet according to the second embodiment of the invention comprises:

(d) applying a radiation-curable resin coating solution continuously to one surface of a cover film wound in a roll form, followed by continuously irradiating the coat formed in order to cure the coat and thereby form a hard coat layer;

(e) forming an adhesive layer continuously onto another surface of the cover film; and (f) punching out into a disc form the cover film on which the hard coat layer and the adhesive layer have been formed.

Each of the steps will be explained below.

The steps (d) and (e) in the process for producing an optical information recording medium transparent sheet according to the second embodiment of the invention are similar to the steps (a) and (b) in the process for producing an optical information recording medium transparent sheet according to the first embodiment of the invention. Accordingly, detailed description of these steps (d) and (e) is omitted. The steps (d) and (e) may be continuously or simultaneously performed in the same apparatus, or may be performed in a reverse order.

<Step (f) of Punching Out into a Disc Form the Cover Film on which the Hard Coat Layer and the Adhesive Layer have been Formed>

In this step (f), the cover film on which the hard coat layer and the adhesive layer have been formed is punched out into a given size, that is, into the form of a disc having the same size as a substrate.

In case where this production process comprises, before the step (f), the step of winding back into a roll form the cover film on which the hard coat layer and the cover film have been formed in order to improve the conveying property of the cover film, this cover film on which the hard coat layer and the adhesive layer have been formed is carried forward so as to be formed into a transient planar state, followed by continuously punching out the planar state to have the same size as that of the substrate by means of a cut punch or the like.

Thereafter, regions other than the punched-out portions of the cover film on which the hard coat layer and the cover film have been formed are wound back into a roll form, to thereby allow readily collecting of waste materials generated by punching.

As stated above, the cover film on which the hard coat layer and the adhesive layer have been formed is punched out into a disc form in the step (f). In case where a releasing film is adhered to the surface of the adhesive layer, an alternative process may comprise the step of punching out three layers of the hard cover layer, the cover film and the adhesive layer without punching out the releasing film, and thereafter the step of removing only regions other than the punched-out portions of the three layers. This process enables to produce a form in which the punched-out cover film, on which the hard coat layer and the adhesive layer have been formed, remains on the releasing film. The cover film in this form may be wound back into a roll form.

The optical information recording medium transparent sheets according to the third and fourth embodiment of the invention, which are produced by the above-mentioned production processes, provide excellent effects that the sheets are good in thickness precision, whether the sheets are in a long sheet (a roll) form or in a disc form, since their hard coat layer is formed through the steps of applying the solution for forming the hard coat layer continuously without using spin coating followed by curing. The sheets also provide an effect having a far better productivity than another sheet in which the hard coat layer is formed by a one-by-one forming method using spin coating.

In case where the optical information recording medium transparent sheet of the invention comprises both of the cover layer made of the cover film on which the adhesive layer has been formed and the hard coat layer has a long sheet form (a roll form), the sheet is molded into a disc form and then the disc is adhered onto a disc-form laminate comprising at least a substrate and a recording layer, whereby an optical information recording medium of the invention may be produced. In case where the sheet of the invention has been beforehand made into a disc form, the sheet is adhered, as it is, to the same laminate as described above, whereby an optical information recording medium of the invention may be produced. In such a manner, the cover layer and the hard coat layer may be simultaneously provided on the optical information recording medium of the invention. Thus, it may be understood that this medium has a high productivity.

Next, the optical information recording medium of the invention is explained in detail.

The optical information recording medium of the invention comprises a substrate having disposed thereon a recording layer and the above-mentioned optical information recording medium transparent sheet.

Respective constituting elements of the optical information recording medium of the invention will be described hereinafter.

Substrate

Specific examples of the substrate material include glass; polycarbonate; acryl resins such as polymethyl methacrylate; vinyl chloride resins such as polyvinyl chloride and polyvinyl chloride copolymer; epoxy resins; amorphous polyolefins; polyesters; and metals such as aluminum. If desired, these may be used in combination. Among these examples, polycarbonate and amorphous polyolefins are preferable, and polycarbonate is particularly preferable from the viewpoint of humidity resistance, dimensional stability and costs.

A thickness of the substrate is preferably within a range of 1.1±0.3 mm.

On the surface of the substrate, a guide groove for tracking or a pre-groove representing information such as address signals is formed. Preferably, pre-grooves are formed directly on the surface of the substrate when a resin material such as polycarbonate is injection-molded or extrusion-molded.

The pre-grooves may be formed by forming a pre-groove layer. The material of the pre-groove layer may be a mixture of a photopolymerization initiator and at least one monomer (or oligomer) selected from monoesters of acrylic acid, diesters thereof, trimesters thereof and tetraesters thereof. In order to form the pre-groove layer, for example, a mixed solution of acrylate, and the photopolymerization initiator is first applied onto a precisely-produced mother die (stamper) and the substrate is put onto this coated layer. Thereafter, the coated layer is irradiated with UV rays, via the substrate or the mother die, so as to cure the UV ray curable resin. In this way, the substrate and the coated layer are adhered and bonded to each other. Next, the substrate is removed from the mother die, whereby the pre-groove layer may be produced. A thickness of the pre-groove layer is generally from 0.01 to 100 μm, and preferably from 0.05 to 50 μm.

In the invention, the track pitch of the pre-grooves on the substrate is preferably from 200 to 400 nm, and more preferably from 250 to 350 nm.

A groove depth of the pre-groove is preferably from 10 to 150 nm, more preferably from 20 to 100 nm, and more preferably from 30 to 80 nm. A half band width thereof is preferably from 50 to 250 nm, and more preferably from 100 to 200 nm.

When a light-reflective layer, which will be described in detail later, is formed, it is preferable to form an undercoat layer on the substrate surface of the side on which the light reflective layer is formed in order to enhance flatness and adhesiveness of the surface.

Examples of the material for the undercoat layer include polymers such as polymethyl methacrylate, acrylic acid/methacrylic acid copolymer, styrene/maleic anhydride copolymer, polyvinyl alcohol, N-methylolacrylamide, styrene/vinyl toluene copolymer, chlorosulfonated polyethylene, nitrocellulose, polyvinyl chloride, chlorinated polyolefin, polyester, polyimide, vinyl acetate/vinyl chloride copolymer, ethylene/vinyl acetate copolymer, polyethylene, polypropylene, and polycarbonate; and surface modifying agents such as a silane coupling agent.

The undercoat layer may be formed by dissolving or dispersing the above-mentioned material into a suitable solvent to prepare a coating solution, and then applying this coating solution onto the surface of the substrate employing such a coating manner as spin coating, dip coating or extrusion coating. A thickness of the undercoat layer is generally from 0.005 to 20 µm, and preferably from 0.01 to 10 µm.

Recording Layer

The recording layer preferably comprises a dye having a maximum absorption within a wavelength range of recording laser light, and more preferably comprises a dye having a maximum absorption within a range of wavelengths of 500 nm or less, such that a laser beam having a wavelength within this range enables recording and reproducing information. Examples of the usable dye include cyanine dyes, oxonol dyes, metal complex type dyes, azo dyes, and phthalocyanine dyes.

Specific examples of usable dye include dyes described in JP-A Nos. 4-74690, 8-127174, 11-53758, 11-334204, 11-334205, 11-334206, 11-334207, 2000-43423, 2000-108513 and 2000-158818; triazole, triazine, cyanine, melocyanine, aminobutadiene, phthalocyanine, cinnamic acid, viologen, azo, oxonol benzoxazol, and benzotriazol. Cyanine, aminobutadiene, benzotriazol, and phthalocyanine are preferable.

The recording layer may be formed by dissolving the above-mentioned dye and a binder, which may be used as desired, into a suitable solvent to prepare a coating solution, applying this coating solution to the surface of the pregrooves on the above-mentioned substrate or the surface of the light-reflective layer to form a coat, and then drying the coat. Furthermore, various additives such as an antioxidant, a UV absorber, a plasticizer and a lubricant may be added to the coating solution depending on the purposes.

The methods for dissolving the dye and the binder may be carried out using an ultrasonic wave, a homogenizer, a disperser, a sand mill, a stirrer, or the like.

Examples of the solvent used in the coating solution for the recording layer include esters such as butyl acetate and cellosolve acetate; ketones such as methyl ethyl ketone, cyclohexanone and methyl isobutyl ketone; chlorinated hydrocarbons such as dichloromethane, 1,2-dichloroethane and chloroform; amides such as dimethylforamide; hydrocarbons such as cyclohexane; ethers such as tetrahydrofuran, ethyl ether and dioxane; alcohols such as ethanol, n-propanol, isopropanol, n-butanol and diacetone alcohol; fluorine-type solvents such as 2,2,3,3-tetrafluoropropanol; and glycol ethers such as ethylene glycol monomethyl ether, ethylene glycol monoethyl ether and propylene glycol monomethyl ether. These solvents may be used alone or in combination of two or more thereof, considering solubility of the dye and the binder therein.

Examples of the binder include natural organic polymeric materials such as gelatin, cellulose derivatives, dextran, rosin and rubber; synthetic organic polymers such as hydrocarbon resins (such as polyurethane, polyethylene, polypropylene, polystylene and polyisobutylene), vinyl resins (such as polyvinyl chloride, polyvinylidene chloride, and polyvinyl chloride/polyvinyl acetate copolymer), acryl resins (such as polymethyl acrylate and polymethyl methacrylate), polyvinyl alcohol, chlorinated polyethylene, epoxy resin, butyral resin, rubber derivatives, and initial condensates of a heat-curable resin such as phenol/formaldehyde resin. When the binder is used as the material for the recording layer, an amount of the binder is preferably from 0.01 to 50 times, and more preferably from 0.1 to 5 times the mass of the dye (mass ratio). By incorporating the binder in the recording layer, storability of the recording layer may be improved.

The concentration of the dye in the thus-prepared coating solution is generally from 0.01 to 10% by mass, and preferably from 0.1 to 5% by mass.

Examples of the method for applying the recording layer include spray coating, spin coating, dip coating, roll coating, blade coating, doctor roll coating, and screen print coating. The recording layer may be mono-layered or multi-layered. A thickness of the recording layer is generally from 20 to 500 nm, and preferably from 50 to 300 nm.

When a temperature at which the recording layer is applied is from 23 to 50° C., there raises no problem. The temperature is preferably from 24 to 40° C., and more preferably from 25 to 37° C.

In order to improve light resistance of the recording layer, various anti-fading agents may be incorporated in the recording layer.

As the anti-fading agent, a singlet oxygen quencher is generally used. As the singlet oxygen quencher, any one selected from singlet oxygen quenchers described in known publications such as patent publications may be used.

Specific examples thereof include singlet oxygen quenchers described in JP-A Nos. 58-175693, 59-81194, 60-18387, 60-19586, 60-19587, 60-35054, 60-36190, 60-36191, 60-44554, 60-44555, 60-44389, 60-44390, 60-54892, 60-47069, 63-209995, and 4-25492, Japanese Patent Application Publication (JP-B) Nos. 1-38680 and 6-26028, DE Patent No. 350399, Journal of the Chemical Society of Japan, October 1992, page 1141, and so on.

A content of the anti-fading agent, such as the singlet oxygen quencher, in all solids present in the recording layer is usually from 0.1 to 50% by mass, preferably from 0.5 to 45% by mass, more preferably from 3 to 40% by mass, and most preferably from 5 to 25% by mass.

An intermediate layer (a barrier layer) may be formed on the surface of the formed recording layer in order to improve adhesiveness of the recording layer to the cover layer and storability of the dye. The barrier layer is a layer made of an oxide, nitride, carbide, sulfide or the like of one or more atoms selected from Zn, Si, Ti, Te, Sm, Mo, Ge and the like. The barrier layer may be made of a hybrid material such as ZnS—$SiO_2$. The barrier layer may be formed by sputtering, vapor deposition, ion plating or some other methods. A thickness thereof preferably ranges from 1 to 100 nm.

Light-Reflective Layer

The light-reflective layer is any layer formed between the substrate and the recording layer in order to improve reflectance of the optical information recording medium when information is reproduced. The light-reflective layer may be formed on the substrate by evaporating, sputtering or ion-plating a light-reflective substance having a high reflectance with respect to the reproducing laser light. A thickness of the light-reflective layer is generally from 10 to 300 nm, and preferably from 50 to 200 nm.

The reflectance is preferably 70% or more.

Examples of the light-reflective substance having a high reflectance include metals and semi-metals such as Mg, Se, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ga, In, Si, Ge, Te, Pb, Po, Sn and Bi; and stainless steel. These light-reflective substances may be used alone, in combination of two or more thereof, or in an alloy form. Among these examples, Cr, Ni, Pt, Cu, Ag, Au, Al and stainless steel are preferable. Au, Ag, Al or alloys thereof are particularly preferable. Au, Ag or alloys thereof are most preferable.

Information is recorded on and reproduced from the optical information recording medium of the present invention, for example, in the following manner. First, while the optical information recording medium is rotated at a given linear velocity (of 0.5 to 10 m/second) or at a given angular velocity, recording light, such as blue-violet laser light (wavelength: e.g., 405 nm) is irradiated through an object lens onto the medium from the side provided with the cover layer. The recording layer absorbs this irradiated light, whereby the temperature at the irradiated portion rises locally. As a result, for example, a pit is formed to thus alter the optical property of the recording layer. Information may be recorded in this manner. The thus recorded information may be reproduced by irradiating blue-violet laser light onto the medium from the side of the cover layer while rotating the medium at a given linear velocity, and then detecting light reflected on the medium.

Examples of a laser light source having an oscillation wavelength of 500 nm or less include a blue-violet semiconductor laser having an oscillation wavelength within a range of 390 to 415 nm, and a blue-violet SHG laser having a central oscillation wavelength of 425 nm.

In order to increase the recording density, an NA of an object lens used for pick-up is preferably 0.7 or more, and more preferably 0.85 or more.

EXAMPLES

Hereinafter, the present invention will be described in more detail by way of the following examples. However, the invention is not limited to these examples.

Example 1

<Production of an Optical Information Recording Medium>

The grooved side of a spirally grooved polycarbonate substrate, (Panlight AD5503 (trade name) manufactured by Teijin Ltd.), which was obtained by injection molding and which had a thickness of 1.1 mm and a diameter of 120 mm and had groove depth of 100 nm, width of 120 nm, and track pitch of 320 nm, was sputtered with Ag, so as to form a light-reflective layer having a thickness of 100 nm.

Thereafter, 20 g of Olazol Blue GN (phthalocyanine-type dye, manufactured by Ciba Specialty Chemical Co.) was added to 1 liter of 2,2,3,3-tetrafluoropropanol by carrying out an ultrasonic treatment for 2 hours to thereby prepare a coating solution for forming a recording layer. The coating solution was applied onto the light-reflective layer at 23° C. and 50% RH by spin coating by varying rotational frequency from 300 to 4,000 rpm. Then, the coating layer was kept at 23° C. and 50% RH for 1 to 4 hours. The thickness of the thus-formed recording layer was 100 nm. A hybrid material made of $ZnS$—$SiO_2$ was sputtered onto the recording layer to have a thickness of 5 nm, to thereby form an intermediate layer (a barrier layer).

<Preparation of an Optical Information Recording Medium Transparent Sheet>

Formation of Hard Coat Layer

First, one end of a cover film (polycarbonate film, Teijin Pure Ace (trade name) provided with a releasing film on one surface thereof and having a thickness of 75 μm) was extended as far as a given coating zone, and the attached releasing film was peeled off. Thereafter, a radiation-curable resin coating solution (UV curable resin, Dicuria SD-715 (trade name) manufactured by Dainippon Ink & Chemicals, Inc.) was continuously applied to one surface from one end of the one surface, from which the releasing film was peeled off, to the other end thereof, so as to form a coat. Then, the coat was successively irradiated with UV rays (emitted from a mercury lamp) so as to apply an energy of 0.23 J/cm². In this manner, the radiation-curable resin (UV curable resin) was cured to thereby form a hard coat layer. Thereafter, this cover film on which the hard film had been formed was wound into a roll form.

Formation of Adhesive Layer

An acrylic-type copolymer (solvent: ethyl acetate/toluene=1/1) was mixed with an isocyanate-type crosslinking agent (solvent: ethyl acetate/toluene=1/1) at a mass ratio of 100:1 to prepare an adhesive coating solution A. This adhesive coating solution A was used to form an adhesive layer on a surface of the releasing film through the indirect method.

While the releasing film wound in a roll form made of polyethylene was being extended, the adhesive coating solution A was applied onto a surface of the releasing film such that a thickness of the coat after dried would be 20 μm. Thereafter, in a drying zone, the resultant product was dried at 100° C. to produce the releasing film on which the adhesive layer had been formed.

[Preparation of an Optical Information Recording, Medium Transparent Sheet]

The releasing film on which the adhesive layer had been formed was adhered and bonded to the cover film at a surface opposite to the surface on which the hard coat layer had been formed, in such a manner that the opposite surface was abutted on the adhesive layer. Thereafter, this cover film on which the hard coat layer and the adhesive layer had been formed was wound back into a roll from. The cover film in this state was kept in an atmosphere of 23° C. and 50% RH for 72 hours.

The cover film on which the hard coat layer and the adhesive layer had been formed was extended and punched out into the same shape as that of the substrate. As a result, an optical information recording medium transparent sheet having both the cover layer and the hard coat layer (i.e., the cover film on which the adhesive layer had been formed) was obtained.

Thereafter, the releasing film attached to the adhesive layer was peeled off from the disc-shaped optical information recording medium transparent sheet, and then the intermediate layer and the adhesive layer were adhered to each other using pressuring means via passing through rollers to thereby produce an optical information recording medium of Example 1.

Evaluation (Evaluation of Thickness Precision of Hard Coat Layer)

The produced optical information recording medium was assessed for a thickness of three layers (the hard coat layer, the cover film and the adhesive layer), which may be measured as a sheet distance between two points using a laser displacement meter (LT8020, manufactured by Keyence Co.) at 8 points in the circumferential direction of the disc shape (at intervals of 45°) and at 8 points in the radius direction (at intervals of 5 mm), that is, at 64 points in total. From a value of (a maximum value–an average value) and another value of (an average value–a minimum value), a thickness unevenness $T_1$ was calculated. Another optical information recording medium produced in the same manner as above, except that no hard coat layer was applied or overlaid, was measured for a sheet distance between the two points (the cover film+the adhesive layer) in the same manner to thereby obtain a thickness unevenness $T_2$. The value of $(T_1-T_2)$ was evaluated as the thickness unevenness of the hard coat layer. The results are shown in Table 1.

Example 2

An optical information recording medium of Example 2 was produced in the same manner as in Example 1, except that after the hard coat layer had been formed on one surface of the cover film in Example 1, a releasing film on which the adhesive film had been formed was adhered and bonded to the cover film at a surface opposite to the surface on which the hard coat layer was formed, without winding back the cover film into a roll form, such that the adhesive layer was abutted on an opposite surface.

The produced optical information recording medium was evaluated in the same manner as in Example 1. The results are shown in Table 1.

Comparative Example 1

An optical information recording medium of Comparative Example 1 was produced in the same manner as in Example 1, except that formation of the cover layer and the hard coat layer was carried out in the following manner.

The produced optical information recording medium was evaluated in the same manner as in Example 1. The results are shown in Table 1.

Formation of Cover Layer and Hard Coat Layer

A UV curable adhesive (SD-347 (trade name) manufactured by Dainippon Ink & Chemicals, Inc., solubility in phthalocyanine-type dye: 0.05% by mass) was applied onto the intermediate layer (the barrier layer), which had been formed by sputtering, by spin coating at a rotational frequency of 100 to 300 rpm. Onto the applied adhesive was put a cover film (polycarbonate film, Teijin Pure Ace (trade name) which had been provided with a releasing film on one surface thereof, thickness: 80 μm) molded into the same shape as that of the substrate. While the rotational frequency was changed from 300 to 4,000 rpm, the adhesive layer was spread over the entire surface. Thereafter, the adhesive layer was irradiated with UV rays emitted from the UV lamp so as to be cured. In this manner, a cover layer was formed.

Thereafter, a UV curable resin coating solution (Dicuria SD-715 (trade name) manufactured by Dainippon Ink & Chemicals, Inc.) was applied onto the cover layer by spin coating at a rotational frequency of 100 to 300 rpm. Thereafter, the coat was spread over the entire surface while the rotational frequency was changed from 300 to 4,000 rpm. This coat was irradiated with UV rays so as to be cured. In this manner, a hard coat layer was formed.

Comparative Example 2

An optical information recording medium of Comparative Example 2 was produced in the same manner as in Example 1, except that formation of the cover layer and the hard coat layer was carried out in the following manner.

The produced optical information recording medium was evaluated in the same manner as in Example 1. The results are shown in Table 1.

Formation of Cover Layer and Hard Coat Layer

While a releasing film wound in a roll form made of polyethylene was extended, the adhesive coating solution A used in Example 1 was applied onto one surface of the releasing film such that a thickness of the coat after dried would be 20 μm. Thereafter, in a drying zone, the resultant product was dried at 100° C. to produce the releasing film on which an adhesive layer had been formed. Immediately thereafter, a releasing film on which the adhesive layer had been formed was adhered and bonded onto one surface of a wound cover film having no releasing film (polycarbonate film, Teijin Pure Ace (trade name) having a releasing film on one surface, thickness: 80 μm) in such a manner that the adhesive layer had been abutted on the cover film.

Thereafter, this cover film on which the adhesive layer had been formed was wound back into a roll form. The cover film in this state was kept in an atmosphere of 23° C. and 50% RH for 72 hours. This cover film on which the adhesive layer had been formed was extended and punched out into the same shape as that of the substrate so as to form a cover layer.

This cover layer was adhered and bonded to the intermediate layer (the barrier layer) which had been formed by sputtering, in such a manner that the adhesive layer was abutted on the intermediate layer. Thereafter, an UV curable resin coating solution (Dicuria SD-715 (trade name) manufactured by Dainippon Ink & Chemicals, Inc.) was applied onto the cover layer by spin coating at a rotational frequency of 100 to 300 rpm. Thereafter, the coat was spread over the entire surface while the rotational frequency was changed from 300 to 4,000 rpm. This coat was irradiated with UV rays so as to be cured. In this manner, a hard coat layer was formed.

TABLE 1

| | Thickness Unevenness of Hard Coat Layer (μm) |
|---|---|
| Example 1 | 10 ± 0.5 |
| Example 2 | 10 ± 0.5 |
| Comparative Example 1 | 10 ± 2.0 |
| Comparative Example 2 | 10 ± 2.0 |

As seen from the results shown in Table 1, it is revealed that the optical information recording medium transparent sheets of Examples 1 and 2 had a smaller thickness unevenness and a better thickness precision, for the hard coat layer, than those of Comparative Examples.

Productivity was compared between the optical information recording media having the optical information recording medium transparent sheets of Examples 1 and 2, and the optical information recording media of Comparative Examples 1 and 2. Since the optical information recording media having the transparent sheets of Examples 1 and 2 were produced by adhering a laminate having the cover layer with another laminate having the hard coat layer, the cover layer and the hard coat layer were disposed simultaneously, and hence, the medium provided an advantage of high productivity.

In contrast, since production of the optical information recording media of Comparative Examples 1 and 2 were carried out in such a way that first, the cover film on which the adhesive layer had been formed (the cover layer) was adhered, and subsequently, the hard coat layer was formed thereon by spin coating by one-by one basis, the media of Comparative Examples 1 and 2 had lower productivity than the media of Examples 1 and 2.

As detailed above, the invention can provide a process for producing an optical information recording medium transparent sheet having high productivity and satisfactory thickness precision, an optical information recording medium transparent sheet produced by this production process, and an optical information recording medium provided with this optical information recording medium transparent sheet.

What is claimed is:

1. A process for producing an optical information recording medium transparent sheet, comprising:
    applying a radiation-curable resin coating solution continuously to one surface of a cover film wound in a roll form, followed by continuously irradiating the coat formed in order to cure the coat and thereby form a hard coat layer;
    forming an adhesive layer continuously onto another surface of the cover film with a releasing film disposed on the adhesive layer; and
    winding back into a roll form the cover film on which the hard coat layer and the adhesive layer have been formed.

2. The process according to claim 1, wherein after the hard coat layer has been formed, the cover film on which the hard coat layer has been formed is wound back into a roll form, and then the roll form of the cover film on which the hard coat layer has been formed is unwound for the step of forming the adhesive layer continuously onto the another surface of the cover film.

3. A process for producing an optical information recording medium transparent sheet, comprising:
    applying a radiation-curable resin coating solution continuously to one surface of a cover film wound in a roll form, followed by continuously irradiating the coat formed in order to cure the coat and thereby form a hard coat layer;
    forming an adhesive layer continuously onto another surface of the cover film; and
    punching out into a disc form the cover film on which the hard coat layer and the adhesive layer have been formed.

4. The process according to claim 3, wherein after the hard coat layer has been formed, the cover film on which the hard coat layer has been formed is wound back into a roll form, and then the roll form of the cover film on which the hard coat layer has been formed is unwound for the step of forming the adhesive layer continuously onto the another surface of the cover film.

5. The process according to claim 3, wherein after the adhesive layer has been formed, the cover film on which the hard coat layer and the adhesive layer have been formed is wound back into a roll form, and then the roll form of the cover film on which the hard coat layer and the adhesive layer have been formed is unwound for the step of punching out into a disc form the cover film on which the hard coat layer and the adhesive layer have been formed.

6. An optical information recording medium transparent sheet produced by a process comprising:
    applying a radiation-curable resin coating solution continuously to one surface of a cover film wound in a roll form, followed by continuously irradiating the coat formed in order to cure the coat and thereby form a hard coat layer;
    forming an adhesive layer continuously onto another surface of the cover film with a releasing film disposed on the adhesive layer; and
    winding back into a roll form the cover film on which the hard coat layer and the adhesive layer have been formed.

7. The optical information recording medium transparent sheet according to claim 6, wherein the cover film comprises polycarbonate or cellulose triacetate.

8. The optical information recording medium transparent sheet according to claim 6, comprising on a surface of the adhesive layer a releasing film selected from the group consisting of a polyethylene film, a polyethylene terephthalate film, a polyethylene naphthalate film, a polycarbonate film and a cellulose triacetate film.

9. An optical information recording medium transparent sheet produced by a process comprising:
    applying a radiation-curable resin coating solution continuously to one surface of a cover film wound in a roll form, followed by continuously irradiating the coat formed in order to cure the coat and thereby form a hard coat layer;
    forming an adhesive layer continuously onto another surface of the cover film; and
    punching out into a disc form the cover film on which the hard coat layer and the adhesive layer have been formed.

10. The optical information recording medium transparent sheet according to claim 9, wherein the cover film comprises polycarbonate or cellulose triacetate.

11. The optical information recording medium transparent sheet according to claim 9, comprising on a surface of the adhesive layer a releasing film selected from the group consisting of a polyethylene film, a polyethylene terephthalate film, a polyethylene naphthalate film, a polycarbonate film and a cellulose triacetate film.

12. An optical information recording medium comprising a substrate on which are disposed a recording layer and an optical information recording medium transparent sheet, in that order, the transparent sheet being produced by a process comprising: applying a radiation-curable resin coating solution continuously to one surface of a cover film wound in a roll form, followed by continuously irradiating the coat formed in order to cure the coat and thereby form a hard coat layer; forming an adhesive layer continuously onto another surface of the cover film with a releasing film disposed on the adhesive layer; and winding back into a roll form the cover film on which the hard coat layer and the adhesive layer have been formed.

13. The optical information recording medium according to claim 12, wherein the substrate comprises polycarbonate or amorphous polyolefin.

14. The optical information recording medium according to claim 12, wherein the substrate comprises a pre-groove having a track pitch of 200 to 400 nm and a groove depth of 10 to 150 nm.

15. The optical information recording medium according to claim 12, wherein the recording layer comprises a dye selected from the group consisting of cyanine dyes, oxonol dyes, metal complex type dyes, azo dyes and phthalocyanine dyes.

16. The optical information recording medium according to claim 15, wherein the recording layer further comprises a singlet oxygen quencher.

17. An optical information recording medium comprising a substrate on which are disposed a recording layer and the optical information recording medium transparent sheet, in that order, the transparent sheet being produced by a process comprising: applying a radiation-curable resin coating solution continuously to one surface of a cover film wound in a roll form, followed by continuously irradiating the coat formed in order to cure the coat and thereby form a hard coat layer; forming an adhesive layer continuously onto another surface of the cover film; and punching out into a disc form the cover film on which the hard coat layer and the adhesive layer have been formed.

18. The optical information recording medium according to claim 17, wherein the substrate comprises polycarbonate or amorphous polyolefin.

19. The optical information recording medium according to claim 18, wherein the substrate comprises a pre-groove having a track pitch of 200 to 400 nm and a groove depth of 10 to 150 nm.

20. The optical information recording medium according to claim 19, wherein the recording layer comprises a dye selected from the group consisting of cyanine dyes, oxonol dyes, metal complex type dyes, azo dyes and phthalocyanine dyes.

* * * * *